US006962054B1

(12) United States Patent
Linney et al.

(10) Patent No.: US 6,962,054 B1
(45) Date of Patent: Nov. 8, 2005

(54) METHOD FOR OPERATING A HEAT EXCHANGER IN A POWER PLANT

(75) Inventors: Jonathan W. Linney, Kingwood, TX (US); Michael B. Bibb, Kingwood, TX (US); Timothy Ray Bauer, Kingwood, TX (US)

(73) Assignee: Johnathan W. Linney, Kingwood, TX (US)

( * ) Notice: Subject to any disclaimer, the term of this patent is extended or adjusted under 35 U.S.C. 154(b) by 222 days.

(21) Appl. No.: 10/413,834

(22) Filed: Apr. 15, 2003

(51) Int. Cl.[7] .......................... F01K 7/32; F01K 13/00; F01K 25/08; F03G 7/00

(52) U.S. Cl. ............................ 60/649; 60/651; 60/653; 60/671; 60/676

(58) Field of Search .......................... 60/649, 651, 653, 60/671, 676, 677

(56) References Cited

U.S. PATENT DOCUMENTS 4,070,871 A * 1/1978 de Cachard et al. .......... 60/651
4,756,162 A * 7/1988 Dayan ......................... 60/649
6,751,959 B1 * 6/2004 McClanahan et al. ........ 60/651
6,820,422 B1 * 11/2004 Linney et al. ................ 60/651
6,820,423 B1 * 11/2004 Linney et al. ................ 60/651
6,857,268 B2 * 2/2005 Stinger et al. ................ 60/651
2004/0011038 A1 * 1/2004 Stinger et al. ................ 60/651

* cited by examiner

*Primary Examiner*—Sheldon J Richter
(74) *Attorney, Agent, or Firm*—Buskop Law Group, P.C.; Wendy Buskop

(57) ABSTRACT

The invention is a method for operating a heat exchanger in a power plant by pumping a heat exchange fluid around a set of tubes in the first heat exchanger; increasing the heat exchange fluid temperature and cooling the compressed heated air; splitting heated fluid flow into a second and third heat exchanger and a vessel; injecting a hydrocarbon flow into the set of tubes in the second heat exchanger; flowing the heated fluid into the second heat exchanger transferring heat from the heated heat exchange fluid to the hydrocarbon flow whose temperature increases between 90% and 500%; flowing the cooled heat exchange fluid to the vessel; flowing the heated fluid from the first heat exchanger to a third heat exchanger and cooling the excess heated heat exchange fluid; and using the vessel to accommodate thermal expansion of the fluid.

18 Claims, 4 Drawing Sheets

METHOD FOR OPERATING A HEAT EXCHANGER IN A POWER PLANT

FIELD OF THE INVENTION

This invention relates to method for operating a heat exchanger in a power plant.

BACKGROUND OF THE INVENTION

A need has existed for a lower cost, fuel efficient system to heat a hydrocarbon stream for subsequent combustion using existing heated air streams already present at a chemical plant, power plant or refinery. This need has been driven by the high cost of energy. A need has existed, which lowers the cost of heating a hydrocarbon stream for combustion.

The present invention is a closed loop system utilizing a plurality of heat exchangers and an existing heated air stream to raise the temperature of fuel or a hydrocarbon stream by at least 50% up to 900%.

SUMMARY OF THE INVENTION

The invention is a method for operating a heat exchanger in a power plant. The method begins by pumping a heat exchange fluid through a first heat exchanger around a first set of tubes; and injecting compressed heated air into the first set of tubes; increasing the temperature of the heat exchange fluid forming a heated heat exchange fluid in the first heat exchanger using the compressed heated air and cooling the compressed heated air.

The method continues by removing the compressed cooled air from the first heat exchanger; removing the heated heat exchange fluid from the first heat exchanger, splitting heated heat exchange fluid and transmitting a first portion to a second heat exchanger, a second portion to a third heat exchanger, and a third portion to a vessel; and injecting a hydrocarbon flow into a second set of tubes in the second heat exchanger.

Next, the method entails flowing the heated heat exchange fluid into the second heat exchanger transferring heat from the heated heat exchange fluid to the hydrocarbon flow forming a heated hydrocarbon flow and a cooled heat exchange fluid, and wherein the second heat exchanger increases the hydrocarbon flow temperature between 50% and 900% discharging the heated hydrocarbon flow to a hydrocarbon flow outlet, and flowing the cooled heat exchange fluid to the vessel.

The method ends by cooling the second portion of the heat exchanger fluid in the third heat exchanger and, then, flowing the cooled heat exchanger fluid to the vessel; using the vessel to accommodate thermal expansion of the fluid from a member of the group consisting the first heat exchanger, the second heat exchanger, the third heat exchanger, and combinations thereof; and pumping the cooled heat exchanger fluid from the vessel to the first heat exchanger.

BRIEF DESCRIPTION OF THE FIGURES

The present invention will be explained in greater detail with reference to the appended Figures, in which.

Figure 1:
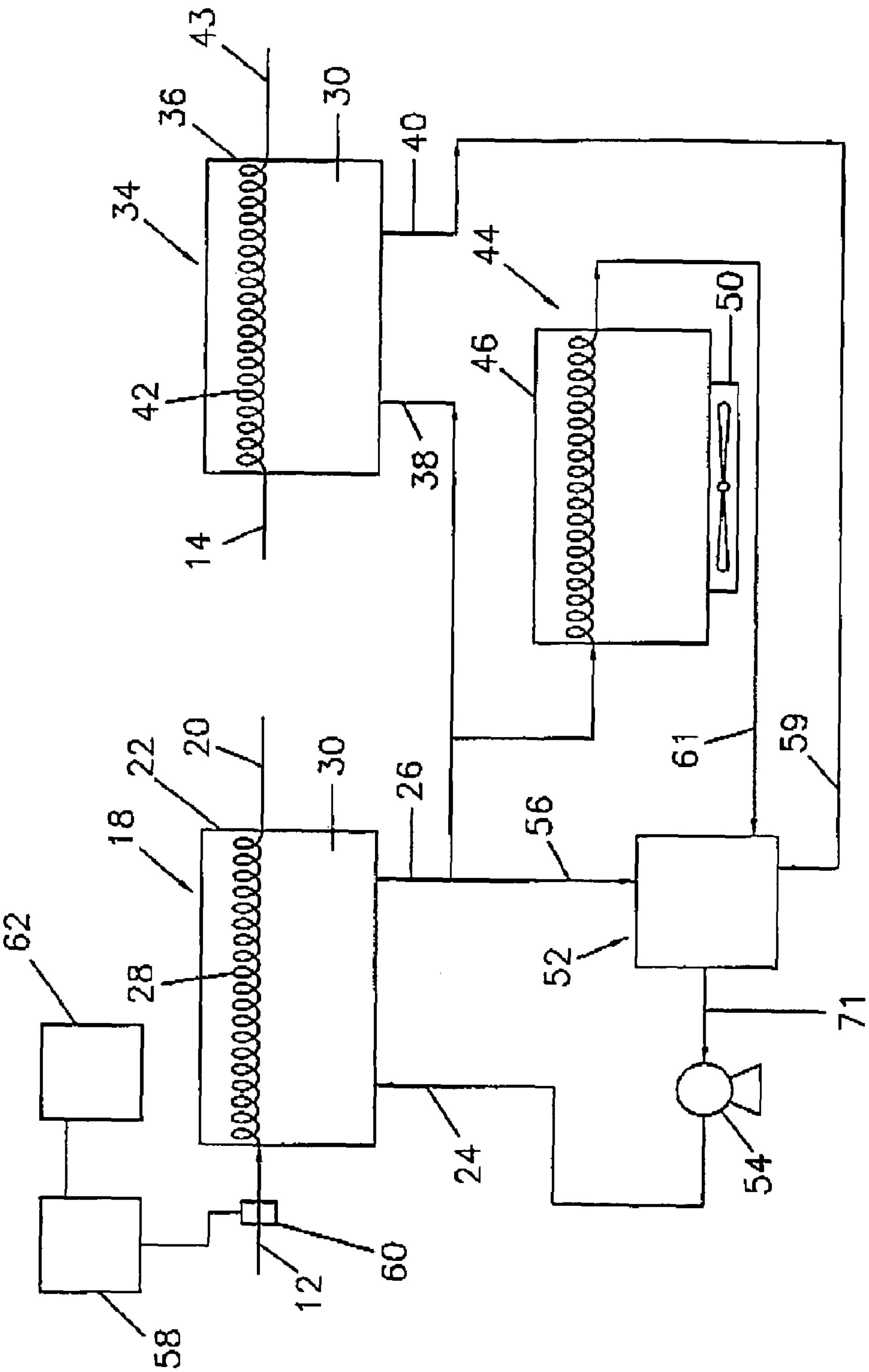
FIG. 1 is an overview of the invention.

The present invention is detailed below with reference to the listed Figures.

DETAILED DESCRIPTION OF THE PREFERRED EMBODIMENTS

Before explaining the present invention in detail, it is to be understood that the invention is not limited to the particular embodiments herein and it can be practiced or carried out in various ways.

The invention is a method for operating a heat exchanger in a power plant.

The method begins by pumping a heat exchange fluid through a first heat exchanger around a first set of tubes, injecting compressed heated air into the first set of tubes. The temperature of the heat exchange fluid rises forming a heated heat exchange fluid in the first heat exchanger. The temperature rises due to the heat transfer from the compressed heated air. The compressed heated air is also cooled in the heat transfer process.

The method continues by removing the compressed cooled air from the first heat exchanger, removing the heated heat exchange fluid from the first heat exchanger. The heated heat exchange fluid is split into three portions. The first portion flows to the second heat exchanger, the second portion goes to the third heat exchanger, and the third portion flows to the vessel.

Next, the hydrocarbon flow is injected into a second set of tubes in the second heat exchanger. The hydrocarbon flow can be group oil, natural gas, methane, propane, and combinations thereof. The heated heat exchange fluid flows into the second heat exchanger transferring heat from the heated heat exchange fluid to the hydrocarbon flow forming a heated hydrocarbon flow. In the process, the heat exchange fluid is cooled. The second heat exchanger increases the hydrocarbon flow temperature between 50% and 900%. The heated hydrocarbon flows to a hydrocarbon flow outlet and the cooled heat exchange fluid flows to the vessel.

The method ends by cooling the second portion of the heat exchanger fluid in the third heat exchanger and, then, flowing the cooled heat exchanger fluid to the vessel and using the vessel to accommodate thermal expansion of the fluid from a member of the group consisting the first heat exchanger, the second heat exchanger, the third heat exchanger, and combinations thereof. Finally, the cooled heat exchanger fluid is pumped from the vessel to the first heat exchanger.

In an alternative method, the method can include the step of using a control panel, at least one sensor, and a central processing unit in communication with the control panel and sensor to monitor and compare the pressurized heat exchange fluid in to a preset value.

The invention relates to a system for heating hydrocarbon flows using heated compressed air, such as from a compressor exhaust for from compressed air available at a power plant.

As the need for higher efficient power plants increases, there is a need for improving the performance of gas fuel heating to improve overall plant efficiency. By essentially preheating the fuel, such as fuel gas to a range of 365 degrees F., gas turbine efficiency is improved by reducing the amount of fuel needed to achieve the desired firing temperatures. Fuel heating is viable and the present invention is directed to a method for fuel heating to improve the plant efficiencies and recycle the heat exchange fluid through a series of heat exchangers.

FIG. 1 shows an overview of the system for the method.

Figure 2:
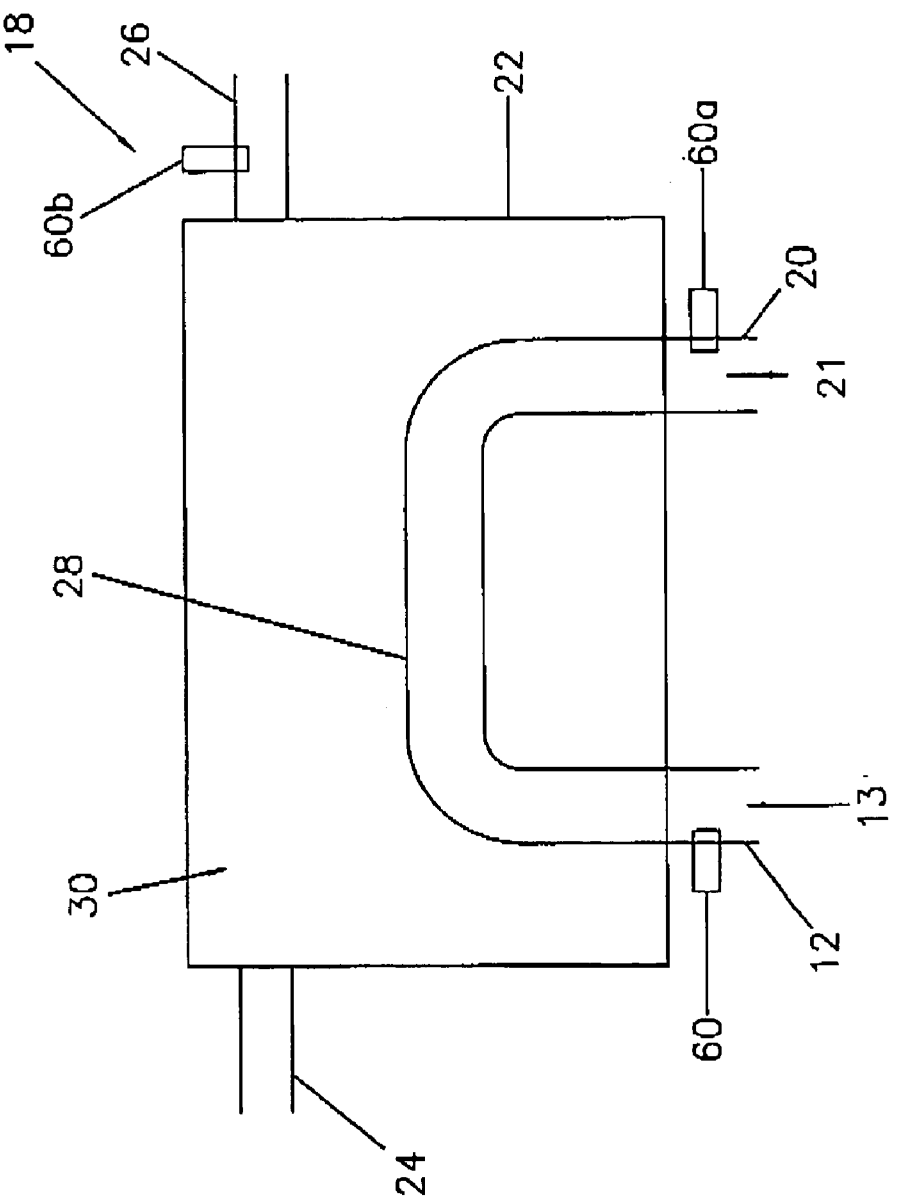
FIG. 2 is a detailed view of the first heat exchanger.

FIG. 1 and FIG. 2 show the first heat exchanger (18) having a housing (22). A detail of this heat exchanger is also shown in FIG. 2. A compressed heated air inlet (12) is disposed in the housing (22). A compressed cooled air outlet (20) is disposed in the housing (22). The housing is preferably of welded construction from steel, and in a high temperature application, would be between ⅛inch and ½inch in thickness. In a preferred embodiment, the compressed heated air inlet has a nominal diameter between 8 inches and 14 inches. The compressed cooled air outlet preferably has the same dimension as the compressed heated air inlet, but they could vary depending on actual location of the housing in the heat exchanger and proximity to other equipment.

The housing (22) further has a first housing inlet (24) disposed in the housing, such as the wall and a first housing outlet (26) is disposed in the housing (22), such as the wall of the housing. The first housing inlet (24) and first housing outlet (26) can be about 6 inches nominal diameter but can range from 3 inches to 12 inches and still be usable in the invention.

The first heat exchanger removes heat from the compressed heated air and increases the temperature of the pressurized heat exchange fluid. On start up of the system, the pressurized heat exchange fluid will change its temperature from an ambient temperature to about 750 degrees F. This activity reduces the temperature of the compressed heated air from 25% to 85%.

Sensors are preferably disposed at each inlet and outlet in the housing, such as a thermal transducer (60), pressure sensor **(60*a*), and thermocouple (60*b*) that are used to monitor temperature and pressure in and out of the housing (22), as shown in FIG. 2**. Sensors, such as those from Fisher Rosemount of Illinois.

A first set of tubes (28) is contained within the housing. One end of the first set of tubes is for receiving compressed heated air (13) through the compressed heated air inlet (12). The other end of the first set of tubes (28) is for communicating the compressed heated air out of the first heat exchanger via the compressed cooled air outlet (20). In a preferred embodiment the tubes are constructed from steel, which could be coated. Alternatively, the steel could be a carbon/steel alloy such as the tubes available from Triad Measurement of Humble, Tex. The tubes can vary from about ¼inch nominal diameter to about 3 inches. The tubes as utilized are coiled. Multiple small tubes could be connected together in series, but it is possible that the air inlet could split into a plurality of tubes. An acceptable overall length of the first set of tubes to hold the air could be between 10 feet and 60 feet. The compressed cooled air (21) flows out of the outlet (20).

A pressurized heat exchange fluid (30) is contained within the first housing and is in communication with the first housing inlet (24) and the first housing outlet (26) and the fluid circulates around the first set of tubes (28). The first heat exchanger transfers heat from the compressed heated air (13) in the first set of tubes to the pressurized heat exchange fluid (30). The invention contemplates that the heat exchange fluid is mineral oil or a glycol. Other examples of usable heat exchange fluids include synthetic oil, a silicon based fluid, a fluid that is a mixture of a terphenyl, a quarterphenyl and a phenanthrene, such as available from Solutia, Inc. known as Therminol® 75 heat transfer fluid of St. Louis Mo.

Figure 3:
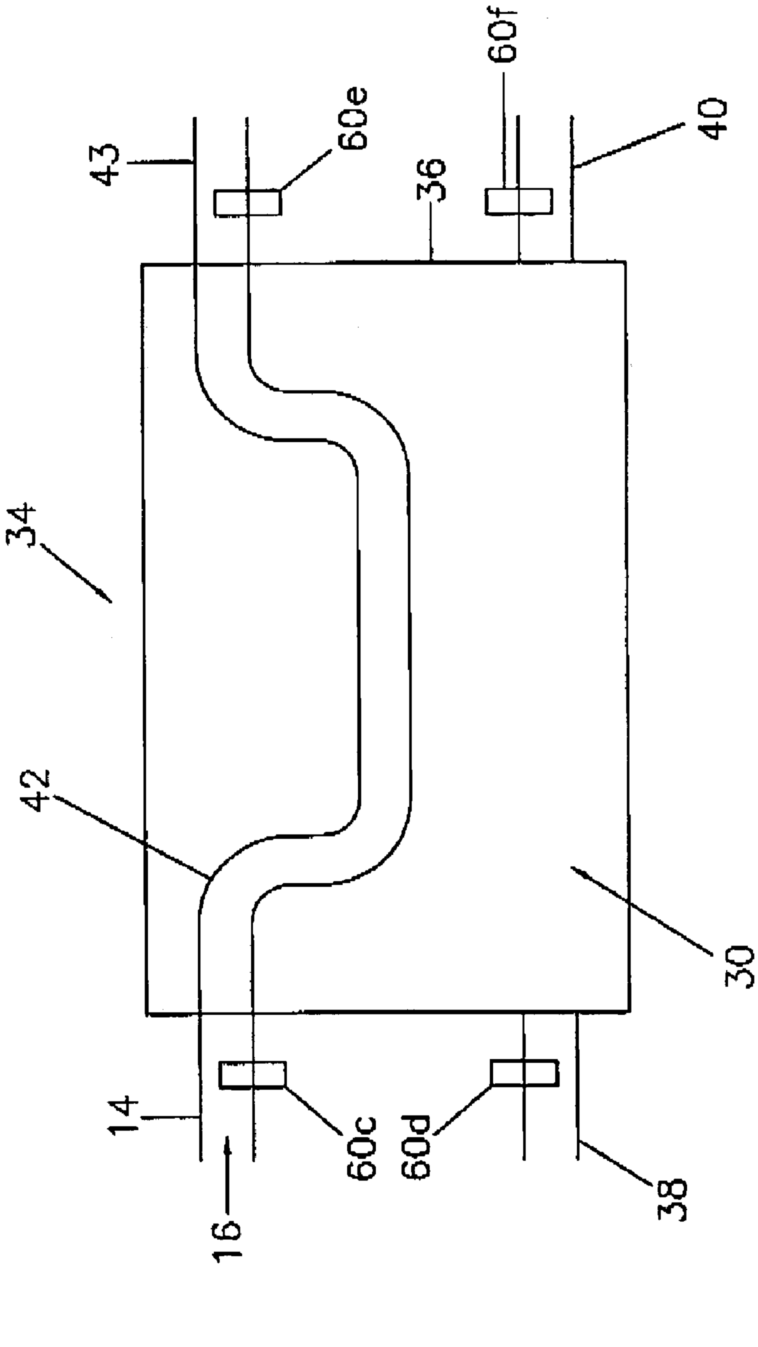
FIG. 3 is a detailed view of the second heat exchanger.

Connected to this first heat exchanger is a second heat exchanger (34). FIG. 3 shows a detail of this second heat exchanger (34).

The second heat exchanger (34) has a second housing (36) and a hydrocarbon flow inlet (14) disposed in the wall of that second housing (36). The hydrocarbon flow inlet (14) preferably has an 8 inch nominal diameter, but can range from 3 inches to 12 inches. A second housing inlet (38) for receiving the pressurized heat exchange fluid from the first heat exchanger is also disposed in the second housing. Preferably, this second housing inlet (38) that received the heat exchange fluid would be 3 inches to 12 inches nominal diameter and preferably a 6 inch nominal diameter. Additionally, a second housing outlet (40) is disposed in the second housing. The second housing outlet (40) would preferably have the same dimensions as the second housing inlet. A heated hydrocarbon flow outlet (43) is disposed in the second housing. The hydrocarbon flow outlet (43) is preferably the same size as the hydrocarbon flow inlet (14). It would be preferred to exactly match the hydrocarbon inlet and outlet to prevent any pressure differentials in the flow. In a retrofit application, it is preferred to use identical inlets and outlets so there is no need for transition piping, or fittings which would affect the flow. Additional sensors **(60*c*, 60*d*, 60*e*, and 60*f*) can be used at each inlet and outlet, respectively, as shown in FIG. 3**.

As shown in FIG. 3 in particular, a second set of tubes (42) is disposed within the second housing (36) and is connected to the hydrocarbon flow inlet (14) for receiving the hydrocarbon flow (16) and communicating with the heated hydrocarbon flow outlet (43). The second set of tubes preferably has a nominal diameter of between ¼inch and 3 inches. The preferred embodiment has the tubes as coiled tubing. However, multiple small tubes could be used wherein the multiple small tubes are connected together in series. It is possible that the hydrocarbon flow inlet could be split into a plurality of tubes at the inlet itself. An acceptable overall length of the second set of tubes to hold the hydrocarbon flow could be between 10 feet and 60 feet.

The second heat exchanger (34) acts to transfer heat from the pressurized heat exchange fluid (30) to the hydrocarbon flow (16) forming a heated hydrocarbon flow (45). In the most preferred embodiment, the heat exchange rate will preferably operate at between 8 million btu per hour and 25 million btu per hour. For example, one system utilizing the second heat exchanger has the second heat exchanger operating at 16.37 million btu per hour.

The heated hydrocarbon flow (45) moves from the second heat exchanger (34) through the heated hydrocarbon flow outlet (43). The second heat exchanger increases the hydrocarbon flow temperature at least 50% for combustion and in some cases increases the temperature up to 900%. A preferred temperate range for the hydrocarbon flow would be from an inlet temperature between 40 degrees F. and 50 degrees F. to an outlet temperature between 350 degrees F. and 400 degrees F. Sensors for temperature and pressure, such as in the first heat exchanger would be disposed in the inlets and outlets for monitoring and managing the pressure and temperatures of the heat exchange fluid and the hydrocarbon flow.

A third heat exchanger (44) is connected to the first heat exchanger (18) and a vessel (52).

Figure 4:
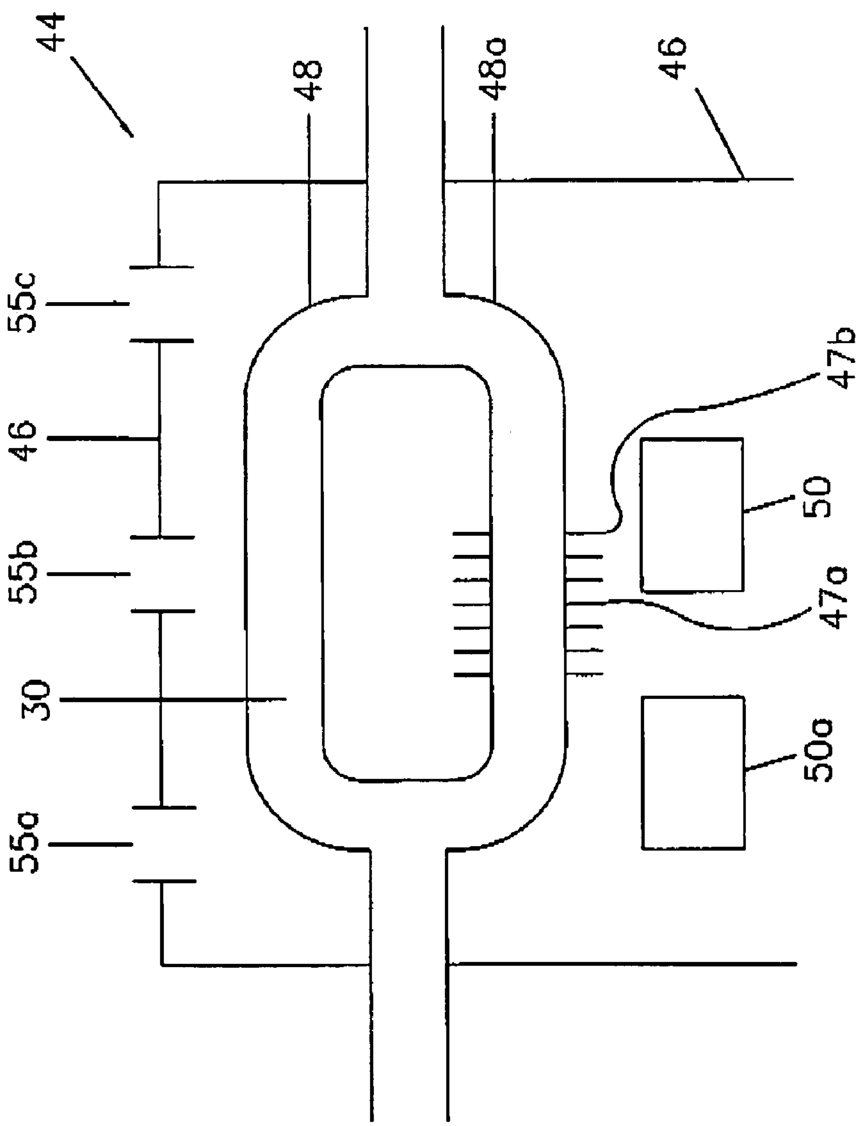
FIG. 4 is a detailed view of the third heat exchanger.

The third heat exchanger (44) is shown in more detail in FIG. 4. The third heat exchanger (44) has a third heat exchanger housing (46), at least one tube (48) disposed in the third heat exchanger housing for receiving the pressurized heat exchange fluid (30) from the first heat exchanger outlet (26) and communicating the pressurized heat exchange fluid (30) to the vessel (52) then through the pump (54) and, then, to the first housing inlet (24) of the first heat exchanger (18). In the preferred embodiment, the third heat exchanger housing is of welded steel or steel alloys and is of a construction that is open on at least one side and evacuation openings (55*a*, 55*b*, and 55*c*), as shown in FIG. 4. However, it is also optionally contemplated that the housing of the third heat exchanger could be a contained system. In the most preferred embodiments, it is contemplated that the first and second heat exchangers are of a shell, or closed container configuration.

The at least one tube of the third heat exchanger can range in nominal diameter from ¼inch to 2 inches. However, other nominal diameters can be used depending on the size of the inlet and outlet for the third heat exchanger.

The tube (48) can be a plurality of tubes (48 and 48*a*) within the housing of the third heat exchanger (44) with optional fins (47*a* and 47*b*) disposed on the tube(s) for exchanging heat more quickly and cooling the heat exchange fluid.

At least one fan (50) is disposed in the third heat exchanger housing to cool the pressurized heat exchange fluid in the at least one tube. More than one fan can be contained in the housing (50), as shown in FIG. 4 and used to cool the tubes containing fluid. A fan, such as an electric motor driven fan, such as 1000 rpm to 4000 rpm fan with direct drive and alloy or polymer blades for directing air, would work within the scope of this invention.

FIG. 1 further shows that a vessel (52) is in communication with the first and third heat exchangers, and optionally in communication with the second heat exchanger, or possibly combinations of at least two of these, or combinations of all three heat exchangers. A line (56) can be used in communication between the first heat exchanger and the vessel. In the most preferred embodiment, the line (56) from the first heat exchanger, the line from the second heat exchanger, and the line (61) from the third heat exchanger are joined prior to entering the vessel (52).

The vessel is adapted to accommodate thermal expansion of the pressurized heat exchange fluid (30). The vessel is typically a carbon steel, or metal alloy, or plastic, a laminate, or graphite composite construction, but the vessel is capable of sustaining a pressure of at least 15 psia and up to at least 300 psia such as those available from Triad Measurement of Humble, Tex. Optionally, the vessel can comprise a heater (67) to prevent "gumming" up of the fluid in the vessel and in the adjacent flowlines.

FIG. 1 also shows that at least one pump (54) is used in this system. This pump is in communication with the vessel (52) for transporting fluid through the line (71). The at least one pump (54) can be a centrifugal pump such as a pump manufactured by Goulds Inc. A preferred pump is an electric driven, 40 hp pump with a flow rate of 400 gal/minute.

In the most preferred embodiment, the system further includes a control panel (58) and at least one sensor (60), and a central processing unit (62) to monitor and direct the pressurized heat exchange fluid in comparison to preset limits, as shown in FIG. 1. The control panel will have conventional gauges, and monitoring displays to show sensor data. The sensors will be conventional pressure and temperature sensors, such as those available from Fisher-Rosemont. The central processing unit is preferably a computer with compiler for processing the sensor data and presenting it on the control panel.

It is contemplated that this invention can be used in a refinery or chemical plant, a power plant, a hot mix asphaltic concrete plant a cement plant or a lime production plant.

It is contemplated that this invention could be used on a floating platform, such as a semi-submersible drilling platform.

One of the contemplated sources of the compressed heated air is a combustion gas turbine or a compressor.

In a preferred embodiment, it is contemplated that the compressed heated air is at a pressure between 80 psia and 300 psia, or more preferably at a pressure between 89 psia and 270 psia.

In a preferred embodiment, it is contemplated that the compressed cool air is at a pressure between 80 psia and 300 psia, or more preferably at a pressure between 89 psia and 270 psia.

The first heat exchanger of this system is designed to cool the compressed heated air between 300 degrees F. and 500 degrees F.

The third heat exchanger is preferably contemplated to be a fin/fan heat exchanger, such as those made by Smith Industries of Tulsa, Okla. As shown in FIG. 4, it preferably has at least one fin (47*a*) on the at least one tube.

The third heat exchanger is contemplated to have a plurality of fans to cool the tubes containing the pressurized heat exchange fluid so that the pressurized heat exchange fluid cools by up to 95%. Two fans (50*a* and 50*b*) are shown in FIG. 4.

The hydrocarbon flow of this invention is contemplated to be oil, natural gas, methane, propane, or combinations of these hydrocarbons.

It should be noted that the hydrocarbon flow inlet receives the hydrocarbon flows source at a rate of between 10 ft/lbs per second and 40 ft/lbs per second, preferably at a rate of 30 ft/lbs per second.

It is also contemplated that this system could be used to control $NO_x$ emissions from a power plant, combustion source, engine or similar source.

While this invention has been described with emphasis on the preferred embodiments, it should be understood that within the scope of the appended claims the invention might be practiced other than as specifically described herein.

What is claimed is:

1. A method for operating a heat exchanger in a power plant comprising the steps of:

a. pumping a heat exchange fluid through a first heat exchanger around a first set of tubes;

b. injecting compressed heated air into the first set of tubes;

c. increasing the temperature of the heat exchange fluid forming a heated heat exchange fluid in the first heat exchanger using the compressed heated air and cooling the compressed heated air;

d. removing the compressed cooled air from the first heat exchanger;

e. removing the heated heat exchange fluid from the first heat exchanger, splitting heated heat exchange fluid and transmitting a first portion to a second heat exchanger, a second portion to a third heat exchanger, and a third portion to a vessel;

f. injecting a hydrocarbon flow into a second set of tubes in the second heat exchanger;

g. flowing the heated heat exchange fluid into the second heat exchanger transferring heat from the heated heat exchange fluid to the hydrocarbon flow forming a heated hydrocarbon flow and a cooled heat exchange fluid, and wherein the second heat exchanger increases the hydrocarbon flow temperature between 50% and 900% discharging the heated hydrocarbon flow to a hydrocarbon flow outlet, and flowing the cooled heat exchange fluid to the vessel;

h. cooling the second portion of the heat exchanger fluid in the third heat exchanger and, then, flowing the cooled heat exchanger fluid to the vessel;

i. using the vessel to accommodate thermal expansion of the fluid from a member of the group consisting the first heat exchanger, the second heat exchanger, the third heat exchanger, and combinations thereof; and j. pumping the cooled heat exchanger fluid from the vessel to the first heat exchanger.

2. The method of claim 1, wherein the method is used at a refinery or a chemical plant.

3. The method of claim 1, wherein the method is used at a power plant.

4. The method of claim 1, wherein the method is performed in a hot mix alphastic concrete plant.

5. The method of claim 1, wherein the method is performed in a cement plant.

6. The method of claim 1, wherein the method is performed in a lime production plant.

7. The method of claim 1, wherein the compressed heated air is injected at a pressure between 80 psia and 300 psia.

8. The method of claim 7, wherein the compressed heated air is injected at a pressure between 89 psia and 270 psia.

9. The method of claim 1, wherein the compressed cool air is removed from the first heat exchanger at a pressure between 80 psia and 300 psia.

10. The method of claim 1, wherein the cooling in the first heat exchanger occurs at a temperature between 300 degrees F. and 500 degrees F.

11. The method of claim 1, comprising the step of using a fin/fan heat exchanger as the third heat exchanger.

12. The method of claim 1, wherein the cooling in the third heat exchanger is by a fan that cools the pressurized heat exchange fluid by up to 95%.

13. The method of claim 1, wherein the step of flowing the hydrocarbon flow is by flowing a member consisting of the group oil, natural gas, methane, propane, and combinations thereof.

14. The method of claim 13, further wherein the step of flowing the hydrocarbon flow is at a rate between 10 ft/lbs per second and 40 ft/lbs per second.

15. The method of claim 1, wherein the step of using a vessel involves using a vessel adapted to sustain a pressured heat exchange fluid between 15 psia and 300 psia.

16. The method of claim 1, wherein step of pumping the heat exchange fluid is by pumping of a mineral oil or pumping a glycol through the first, second and third heat exchangers.

17. The method of claim 1, further comprising the step of using a bypass line between the first heat exchanger and the vessel.

18. The method of claim 1, further comprising the step of using a control panel, at least one sensor, and a central processing unit in communication with the control panel and sensor to monitor and compare the pressurized heat exchange fluid in to a preset value.

* * * * *